(12) United States Patent
Itoh

(10) Patent No.: US 8,564,863 B2
(45) Date of Patent: Oct. 22, 2013

(54) IMAGE PROCESSING DEVICE THAT REDUCES A NON-TARGET IMAGE TO PREVENT THE NON-TARGET IMAGE FROM BEING READ

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 682 days.

(21) Appl. No.: 11/822,238

(22) Filed: Jul. 3, 2007

(65) Prior Publication Data

US 2008/0013137 A1    Jan. 17, 2008

(30) Foreign Application Priority Data

Jul. 15, 2006   (JP) .................................. 2006-194985
Feb. 20, 2007   (JP) .................................. 2007-039156

(51) Int. Cl.
*H04N 1/46*    (2006.01)
(52) U.S. Cl.
USPC ............................ 358/538; 382/163; 382/162
(58) Field of Classification Search
USPC .................... 358/538; 382/163, 162
See application file for complete search history.

(56) References Cited

U.S. PATENT DOCUMENTS

| 5,572,606 | A  | * | 11/1996 | Tanioka ........................ 358/3.08 |
| 6,873,441 | B1 | * | 3/2005  | Kuwabara et al. ............ 358/3.26 |
| 7,130,469 | B2 | * | 10/2006 | Adachi ........................ 382/224 |
| 7,292,375 | B2 | * | 11/2007 | Nishida ....................... 358/3.26 |

FOREIGN PATENT DOCUMENTS

| JP | A 2001-169080 | 6/2001 |
| JP | A 2002-252746 | 9/2002 |
| JP | A 2002-252766 | 9/2002 |
| JP | A 2002-290748 | 10/2002 |
| JP | A 2002-300382 | 10/2002 |
| JP | A 2003-051946 | 2/2003 |
| JP | A 2003-234897 | 8/2003 |
| JP | A 2003-259105 | 9/2003 |
| JP | A 2003-274182 | 9/2003 |

\* cited by examiner

*Primary Examiner* — Paul F Payer
(74) *Attorney, Agent, or Firm* — Oliff & Berridge, PLC

(57) ABSTRACT

An image processor includes: an edge determination unit that determines an edge in an image; and a color estimation unit that estimates an original color of the image which is not affected by an another image read together as a non-target image, according to a result of the edge determination performed by the edge determination unit.

21 Claims, 14 Drawing Sheets

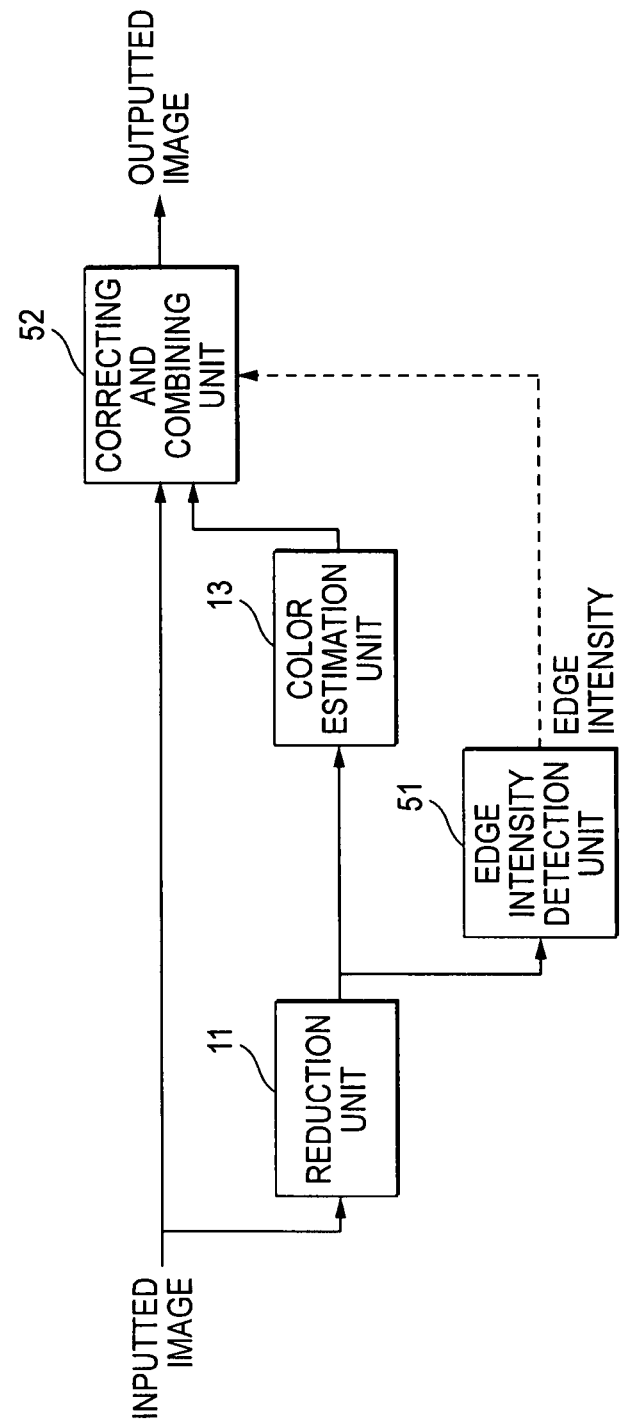

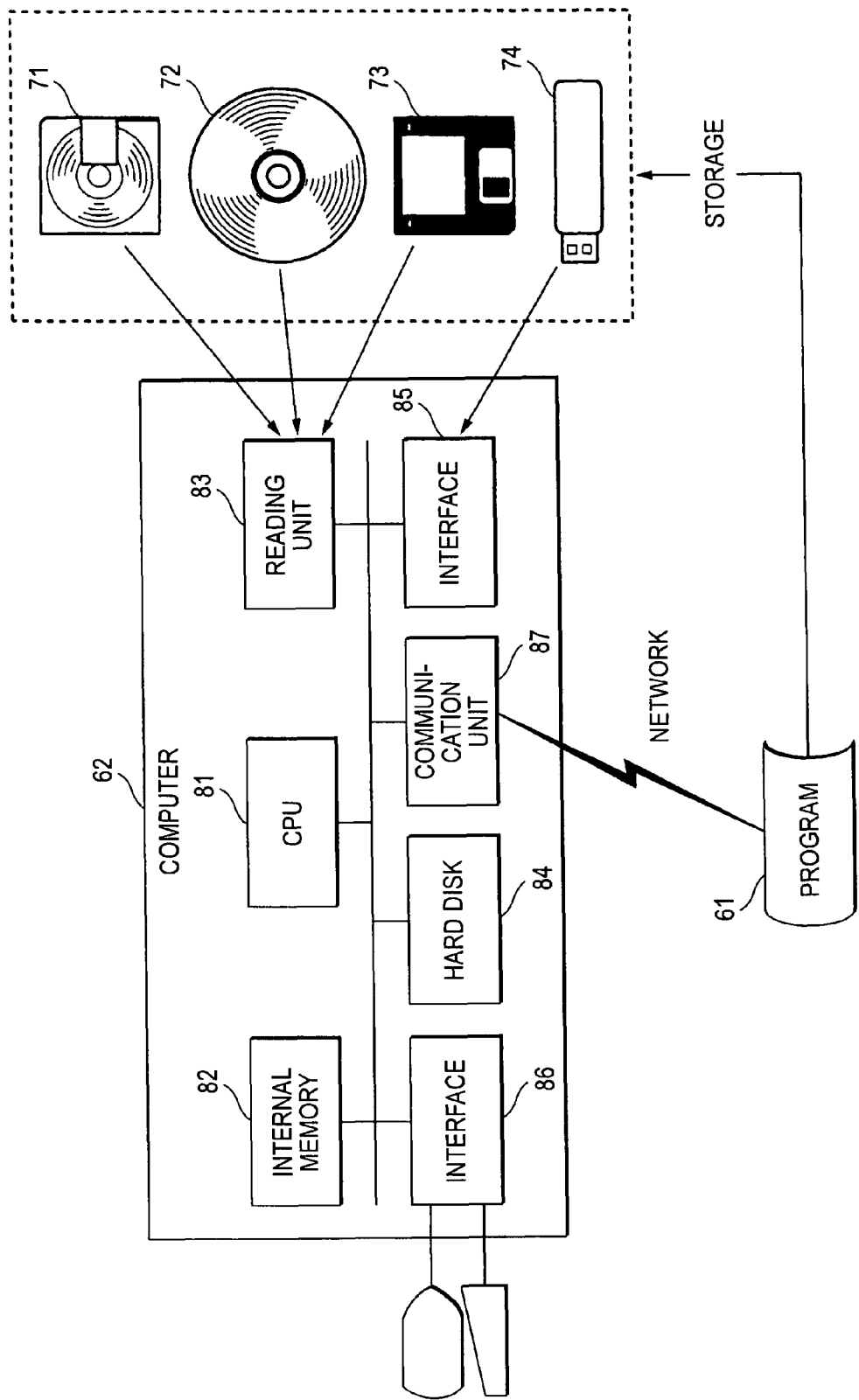

IMAGE PROCESSING DEVICE THAT REDUCES A NON-TARGET IMAGE TO PREVENT THE NON-TARGET IMAGE FROM BEING READ

CROSS-REFERENCE TO RELATED APPLICATION

This application is based on and claims priority under 35 USC 119 from Japanese Patent Application Nos. 2006-194985 filed Jul. 15, 2006 and 2007-039156 filed Feb. 20, 2007.

BACKGROUND

1. Technical Field

The present invention relates to an image processor, a computer readable medium and a computer data signal.

2. Related Art

Conventionally, when reading an image on one side of an original sheet which has images on both sides thereof or an image of an original sheet on which other original sheets are stacked, there has been occurring a so-called back-side image reading in which not only the target image but also the image on the back side of the original sheet or the image on the one other original sheet stacked on the original sheet are read. As one of techniques which eliminate a non-target image which is read from a back side of an original sheet, a technique is known in which images on both sides of an original sheet are read together, so that the image read from the back side of the original sheet is eliminated by referring to the images on both the sides of the original sheet.

In a method for removing a non-target image which is read together with a target image of an original sheet by referring to the image only on one side thereof, the removal of the non-target image has been realized by performing a so-called background removing process. The background removing process is such that a gradation correction is performed on the read image according to some certain fixed value or detected background level.

SUMMARY

According to an aspect of the invention, there is provided an image processor, including: an edge determination unit that determines an edge in an image; and a color estimation unit that estimates an original color of the image which is not affected by an another image read together as a non-target image, according to a result of the edge determination performed by the edge determination unit.

BRIEF DESCRIPTION OF THE DRAWINGS

Exemplary embodiments of the present invention will be described in detail based on the following figures, wherein:

FIG. 12 illustrates a block diagram showing a third exemplary embodiment according to an aspect of the invention;

FIG. 16 illustrates an explanatory diagram showing exemplary examples of a computer program which results when realizing the function of the image processor according to an aspect of the invention by a computer program, a storage medium which stores the computer program and a computer installing therein the storage medium.

DETAILED DESCRIPTION

Figure 1:
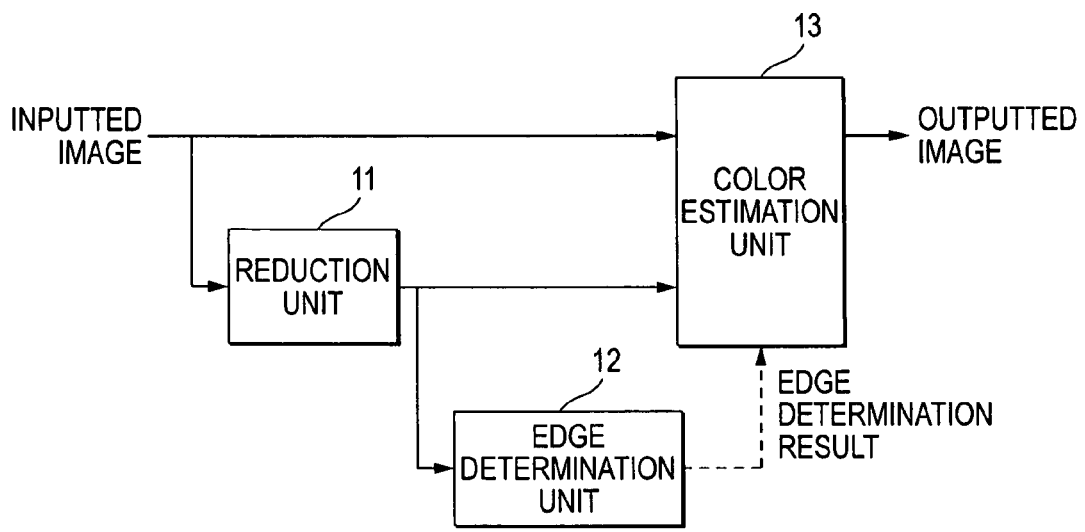
FIG. 1 illustrates a block diagram showing a first exemplary embodiment according to an aspect of the invention.

FIG. 1 is a block diagram which shows a first exemplary embodiment of the invention, in which reference numeral 11 denotes a reduction unit, 12 an edge determination unit, and 13 a color estimation unit. Although any image can be inputted, since a process is performed for removing a non-target image read from, for example, a back side of an original sheet, in particular, an image is preferably inputted in which a non-target image is read together therein from a back side of an original sheet. As is described above, reading a non-target image together with a target image occurs frequently when an image reading process is carried out, for example, on an original sheet having images formed on both sides thereof or on an original sheet on which one other original sheet having an image formed thereon is stacked, and such a read image may constitute an inputted image.

The reduction unit 11 applies a reducing process to an inputted image. Any known reduction method may be used as the reduction method. Although the reduction ratio is arbitrary, halftone dots are to be collapsed in a halftone-dot image region to which a screen process is applied.

The edge determination unit 12 determines an edge in an image based on the image which is reduced by the reduction unit 11. An edge determination method is arbitrary, and hence, various known methods can be adopted. The result of a determination is sent to the color estimation unit 13.

When a read image includes an image which is read together as a non-target image, for example, from a back side of an original sheet, the color estimation unit 13 estimates an original color which is not affected by the image read as the non-target image from the back side of the original sheet. As this occurs, such a color estimation process is performed according to the result of an edge determination process performed by the edge determination unit 12. In this embodiment, color estimation is performed by utilizing an inputted image on an edge region which is determined as edge based on the result of the edge determination by the edge determination unit 12. In addition, as to a non-edge region which is determined as something other than edge based on the result of edge determination by the edge determination unit 12, the color of a pixel is estimated which constitutes a target pixel on which a process for removing the non-target image read from the back side of the original sheet is to be performed. Furthermore, process parameters (to be set) when performing the color estimation may be made different between the edge region and the non-edge region.

Figure 2:
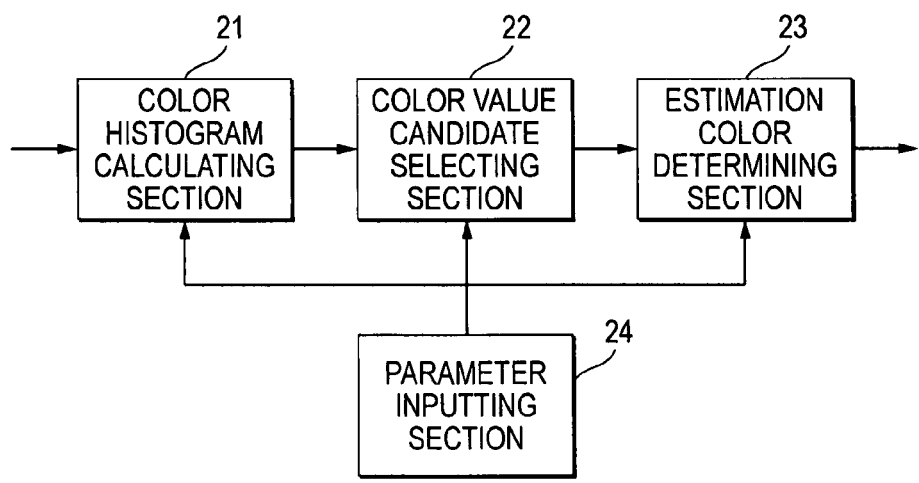
FIG. 2 illustrates a block diagram showing an exemplary example of a color estimation unit.
Figure 3:
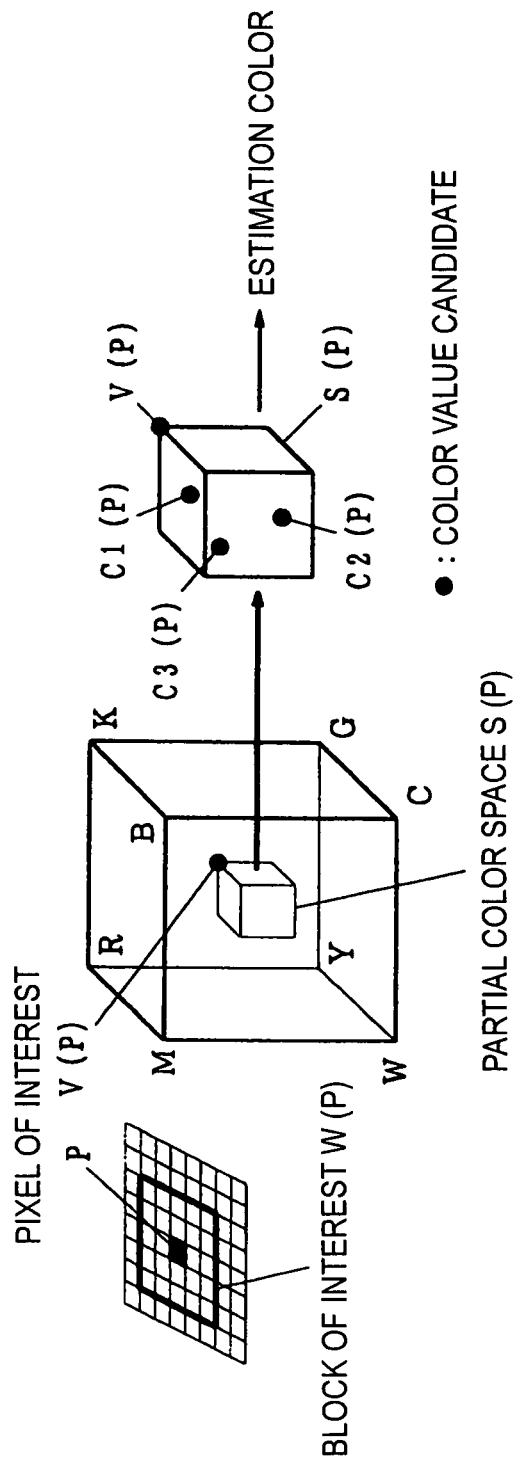
FIGS. 3A to 3C illustrate an explanatory diagram of an exemplary example of an operation of the color estimation unit.

FIG. 2 is a block diagram which shows an exemplary example of the color estimation unit, and FIG. 3 shows explanatory drawings which illustrate an operation of the color estimation unit. In the figure, reference numeral 21 denotes a color histogram calculating section 21, 22 a color value candidate selecting section, 23 an estimation color determining section, and 24 a parameter inputting section. The color estimation unit 13 in FIG. 1 may be realized by a configuration such as shown in FIG. 3.

The color histogram calculation unit 12 calculates a color histogram of each of pixels within a block of interest which is made up of a region of a predetermined size which contains a pixel which constitutes a target pixel on which the process of removing a non-target image read, for example, from the back side of the original sheet is performed. A portion surrounded by thick lines in FIG. 3A is made to be an exemplary example of the block of interest, and color histograms of pixels situated within the range so surrounded are calculated. A calculated histogram constitutes a frequency value within, for example, a three-dimensional color space as is shown in FIG. 3B.

The color value candidate selecting section 22 substitutes the color of the target pixel on which the non-target image removing process is to be performed, that is, selects a candidate (a color value candidate) for the original color which is not affected by the non-target image read from the back side of the original sheet. As a process therefor, firstly, a quadratic differential is performed on a histogram within a certain partial color space from a position within a color space which corresponds to the color of the target pixel on which the non-target image removing process is to be performed, so as to obtain the color (a color in which the frequency becomes a local maximum or extremum) of a convex portion of the frequency. The color of the convex portion of the frequency so obtained is made to be a color value candidate.

A black circular dot in FIG. 3B is made to a position which corresponds to the color of the pixel on which the non-target image removing process is to be performed, and a three-dimensional region (a partial color space) which is formed with the black circular dot acting as a vertex thereof is made to be an object for the quadratic differential. The three-dimensional region which constitutes the object for the quadratic differential is taken out of the three-dimensional color space so as to be shown solely in FIG. 3C, and black circular dots shown thereon indicate colors where the frequency becomes a convex portion as a result of the quadratic differential. These colors constitute color candidates.

The estimation color determination section 23 determines an estimation color which is estimated as the original color which resulted before the non-target image is read from the back side of the original sheet from the color value candidates selected at the color value candidate selecting section 22. There are considered several methods as a determination method. For example, a color value candidate which has a maximum frequency value, a color value candidate which has a small color difference between the color of the pixel on which the non-target image removing process is to be performed and the color thereof, a color value candidate which has a high brightness and the like may be selected from the color value candidates. Of course, these color value candidates may be combined or selections based on other conditions may be made. Alternatively, an intermediate color of a plurality of color value candidates may be determined as the estimation color, or the estimation color may be determined by performing a weighted operation from a relationship with the color of the target pixel on which the non-target image removing process is to be performed. Thus, the estimation color may be determined using the various methods.

Parameters are inputted into the parameter inputting section 24 from an input device such as a keyboard, or the parameter inputting section 24 obtains parameters which are stored in advance, so that the parameters so inputted or obtained are set in the respective sections such as the color histogram calculating section 21, the color value candidate selecting section 22 and the estimation color determining section 23. For example, the parameter inputting section 24 may change the parameters based on an edge determination result passed thereto from the edge determination unit 12.

Figure 4:
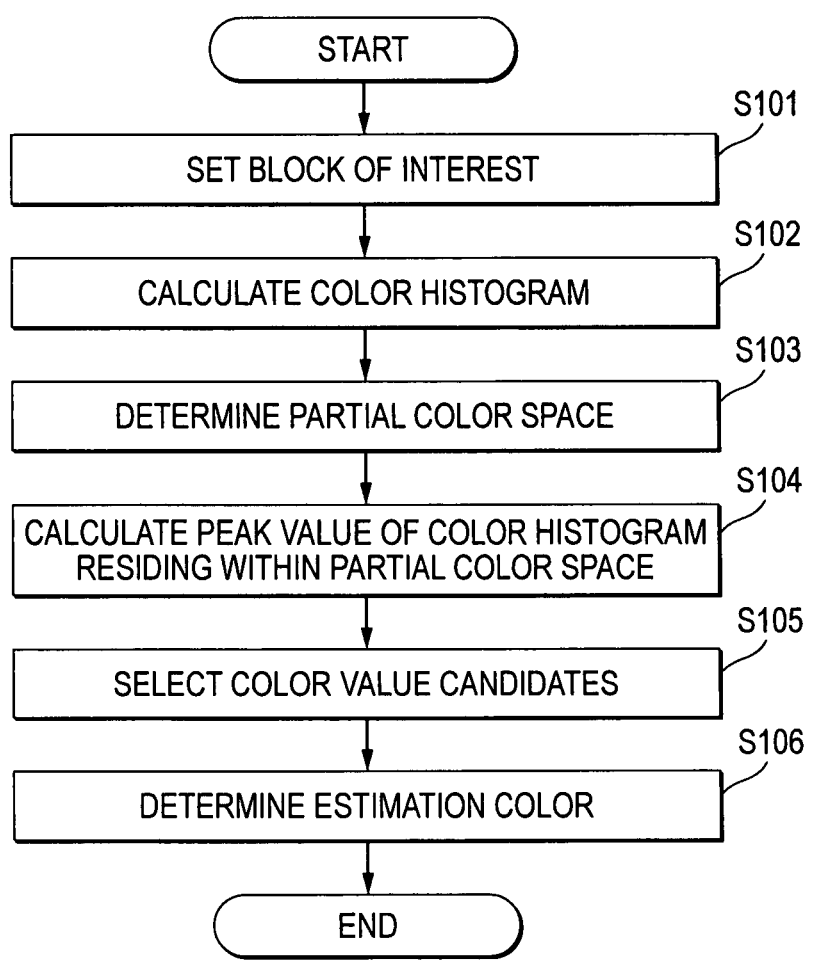
FIG. 4 illustrates a flowchart illustrating the exemplary example of the operation of the color estimation unit.

FIG. 4 is a flowchart which illustrates an exemplary example of an operation of the color estimation unit. Note that in the example of the operation shown in FIG. 4, a process is illustrated in which the non-target image removing process is performed on one pixel of pixels which constitutes a target pixel on which the relevant process is to be performed. The target pixel on which the non-target image removing process is to be performed is to execute sequentially the following process on pixels of an inputted image as target pixels on which the relevant process is to be performed. As this occurs, as to a pixel which is determined as a non-edge region by the edge determination unit 12, the following process will be executed on a pixel of an image reduced by the reduction unit 11 which corresponds to a pixel of the inputted image which constitutes a target pixel on which the non-target image removing process is to be performed by utilizing the image reduced by the reduction unit 11.

Firstly, in step S101, a block of interest W (P) is defined in the neighborhood of a pixel P (a target pixel) on which the non-target image removing process is to be performed (FIG. 3A). Although the way of defining the block of interest W (P) is arbitrary, the block of interest W (P) may be made into a square of n pixels×n pixels which is centered at a pixel of interest P. In the example shown in FIG. 3A, an example is shown in which the block of interest W (P) is a square of 5 pixels×5 pixels. Of course, the number and shape of pixels that are to be contained in the block of interest may be set arbitrarily.

In addition, since the image which is reduced by the reduction unit 11 is used in the non-edge region, in the event that blocks of interest having the same numbers of pixels are used, when compared with a case where the inputted image is used in the edge region, a wide range is to be referred to on the inputted image. Consequently, the color may be estimated from a wide range of pixel colors in the non-edge region, whereas in the edge region, the edge may be preserved by estimating the color from a narrow range of pixel colors. Of course, the size of the block of interest may be changed between the edge region and the non-edge region. As this occurs, a reference range on the inputted image should be set such that a reference range for the non-edge region is wider than a reference range for the edge region. Not only are the size and shape of the block of interest set in the color histogram calculating section 21 in advance, but also the size and shape of the block of interest may be set by the parameter input section 24.

Following this, in step S102, a color histogram (that is, a frequency distribution in the color space) is calculated by the color histogram calculation section 21 as to the pixels (5×5=25 pixels in the example shown in FIG. 3A) within the block of interest W (P).

Following this, in step S103, a partial color space is defined in the neighborhood of the position of a pixel value for the pixel of interest P in the color space. FIG. 3B shows the example in which the position of the pixel value V (P) of the pixel of interest P in the color space is indicated by the black circular dot, and a regular hexahedron which is formed with the relevant position acting as one of vertices is defined as the partial color space S (P). An interior of the partial color space is a region where a color value which substitutes the pixel value of the pixel of interest P (in other words, an estimation color value which is estimated as a color value of the original color which is not affected by a non-target image read, for example, from a back side of an original sheet) is looked for. The position, size and shape of the partial color space S (P) may be fixed in advance or may be set appropriately based on characteristics of image data or the pixel value of the pixel of interest P. For example, a rectangular parallelepiped or a sphere may be used as the shape of the partial color space. However, normally, a pixel value of a pixel in which a non-target image is read from the back side of the original sheet is a subtractive color mixing of the color of a target image and the color of the non-target or undesirable image, and therefore, the position of the partial color space is preferably determined in consideration of this fact. FIG. 3B shows a case where the partial color space S (P) is situated in a region whose brightness is higher than the pixel value V (P) of the pixel of interest P.

In addition, in the event that the partial color space S (P) is the regular hexahedron, the size (the length of a side) of the regular hexahedron may be determined based on the pixel value of the pixel of interest as follows, for example. Namely, let the brightness of the pixel value V (P) of the pixel of interest P be B (P) and the degree of edge of the pixel of interest P be E (P), the length L of a side will be determined according to the following equations:

$$L=f[B(P)]; f[x] \text{ is a monotone increasing function of } x \quad (1)$$

$$L=g[E(P)]; g[x] \text{ is a monotone decreasing function of } x \quad (2)$$

For example, f (x)=a×x$^{(n)}$, where a is a positive constant, and n is a real value which is equal to or larger than 1. g (x) is, for example, −a×x$^n$. Alternatively, g (x) may be an exponential decreasing function such as g (x)=a×exp (−x$^n$). Namely, in Equation (1), the brighter the pixel of interest is, the larger the size of the partial color space s (P) is set. In case the size of the partial color space S (P) is made larger, the number of pixels which are contained in the relevant space becomes larger. Consequently, a pixel whose color value is apart from the pixel value of the pixel of interest (that is, whose distance in the color space is large) is made to be selected as a candidate. This is because the empirical fact is taken into consideration that the higher the brightness of the pixel becomes, the color value of the pixel has to be substituted by a color value of higher brightness, otherwise it becomes difficult to remove completely a non-target image read from the back side of the original sheet.

In addition, in Equation (2), the lower the degree of edge of the pixel of interest P becomes, the size of the partial color space S (P) is preferably set larger. This is because in the event that the degree of edge is high (that is, the relevant pixel lies in and in the neighborhood of the edge region), a pixel whose color value is far away from the pixel value V (P) of the pixel of interest P is prevented from being selected as a candidate. The change in gray level is large in the edge region, and the possibility is not low that there exists a plurality of colors as the original color that is not affected by a non-target image read from a back side of an original sheet. Because of this, in order not to estimate a wrong color as the original color, the size of the partial color space S (P) should preferably be made small. In addition, a color may be estimated from a wide range of colors for the non-edge region, and even in the event that the color is changed due to reading a non-target image from the back side of the original sheet, the color that would exist before the non-target image has been read from the back side of the original sheet may be estimated properly. Note that the degree of edge may be obtained from the edge determination unit 12. Alternatively, the size of the partial color space S (P) may be changed using the result of a determination of whether it is in the edge region or the non-edge region which is passed from the edge determination unit 12.

The length L of one side may be calculated according to the following equation by taking into consideration both brightness and degree of edge by combining Equation (1) and Equation (2).

$$L=q1 \times f[B(P)]+q2 \times g[E(P)] \quad (3)$$

where, q1, q2 denote weight coefficients. The size and shape of a partial color space S (P) like one defined as above may be set at the color value candidate selecting section 22 or the parameter inputting section 24.

Following this, in step S104, the color value candidate selecting section 22 determines a peak position (that is, a pixel value at which frequency takes a local maximum) and a value thereof (a frequency peak value) from the color histograms calculated in S102. The peak position may be determined, for example, by calculating a differential value and a quadratic differential value of a three-dimensional color histogram. Then, among the peak positions so determined, those whose pixel values are within the partial color space S (P) are extracted.

Following this, in step S104, the color value candidate selecting section 22 selects only a predetermined number (for example, "3") of peak positions from those extracted, and the peak positions so selected are made to be color value candidates. As a selecting method, for example, the peak positions are selected in order of peak sharpness based on the quadratic differential value of the three-dimensional color histograms. Alternatively, in the event that the number of peak positions so extracted does not reach the predetermined number, the pixel values of all the extracted peak positions may be selected as the color value candidate. FIG. 3C shows a case where three color value candidates C1 (P), C2 (P) and C3 (P) are selected.

Following this, in step S106, the color estimating section 23 estimates the original color of the pixel of interest P which is not affected by the non-target image read from the back side of the original sheet based on the color value candidate so selected. The estimation of the original color which would exist before the non-target image has been read from the back side of the original sheet may be performed by adopting at least anyone of the following four criteria. Note that in the following criteria, n=1, 2, . . . , N, where N denotes a total number of color value candidates.

(A) Frequency value of color value candidate Cn (P): (specifically, a color value candidate whose frequency value is larger is determined as being close to the original color value).
(B) Difference in color value between the pixel value V (P) of the pixel of interest and the color value candidate Cn (P): (specifically, a smaller color difference relative to the pixel value V (P) of the pixel of interest is determined as being closer to the original color value).
(C) Relationship between the degree of edge E (P) of the pixel of interest and the brightness of the color value candidate Cn (P): (specifically, the smaller the degree of edge E (P) of the pixel of interest becomes, a color value candidate of higher brightness is determined as being close to the original color value).
(D) Relationship between brightness value of the pixel value V (P) of the pixel of interest and brightness value of the color value candidate Cn (P): (specifically, the higher the brightness of the pixel of interest P becomes, a color value candidate of higher brightness is determined as being closer to the original color value).

The color value candidate Cn (P) which is determined as being closest to the original color value using any of the criteria described above is determined as the estimation color and the pixel value V (P) of the pixel of interest is substituted thereby. For example, when adopting Criteria (A), the pixel value V (P) of the pixel of interest is substituted by a color value candidate Cn (P) whose frequency value is maximum.

In addition, the estimation color may be determined by a combination of the four criteria descried above. Specifically, a degree of true color value Dn (P), which is defined by the following equation, is calculated for each of color value candidates Cn (P), and a color value candidate which has a highest degree of true color value D (=Max {D1(P), D2(P), ..., DN (P)}) in those so calculated is determined as an estimation color. Note that Max (Xn) (n=1, 2, ...) denotes a maximum value of X1, X2, ... The degree of true color value Dn (P) may be obtained, for example, in the following manner.

$$Dn(P) = w1 \times f1[Sn(P)/\text{Max}(Sn(P))] + w2 \times g1 [ABS(V(P) - Cn(P))] + w3 \times g2 [E(P)] \times f2 [Bn(P)] + w4 \times f3 [B(P)] \times f4 [Bn(P)] \quad (4)$$

where, in the equation above, fi[X] (i=1 to 4) is a monotone increasing function of X, and gj [X] (j=1 to 2) is a monotone decreasing function of X. In addition, Sn (P) denotes the frequency value of the color value candidate Cn (P), and wm (m=1 to 4, wm>0) denotes a weight coefficient for each of the criteria (A) to (D) above. Furthermore, B (P) and Bn (P) denote the brightness of the pixel of interest P and the brightness of the color value candidate Cn (P), respectively. In addition, ABS (X) denotes an absolute value of X.

As is seen from Equation (4), first to fourth terms each denote contribution from the criteria (A) to (D) above. Note that although values of the weight coefficients for the respective criteria are arbitrary, they are preferably set such that w1>w2>w3>w4. Namely, in this case, when an estimation color is selected from the color value candidates Cn (P), Criterion (A) (that is, the frequency value Sn (P) of the color value candidate Cn (P) ) is regarded relatively as most important, while Criterion (D) (that is, the relationship between the brightness value of the pixel value V (P) of the pixel of interest and the brightness value of the color value candidate Cn (P) ) is regarded relatively as lest important.

In addition, an estimation color may be determined by not selecting one from color value candidates but selecting an intermediate color of a plurality of color value candidates. Specifically, a true color value CT (P) which corresponds to the pixel of interest P may be calculated according the following equation.

$$CT(P) = \Sigma_{n=1}^{N} kn \cdot Sn(P) \cdot Cn(P) \quad (5)$$

where, kn denotes a weight coefficient, and for example, kn=1/Max{Sji (P)} relative to all n's (n=1, 2, ...). As is seen from the above equation, in this example, a true color value is calculated for each of N color value candidates by multiplying its color value by its frequency value to be added thereto. In this example, all the extracted color value candidates may be reflected on the estimation color.

In the case of the above equation, Criterion (A) is adopted, but the invention is not limited thereto, and hence, a value calculated by utilizing at least one of the criteria (B) to (D) may be determined as an estimation color. In short, one color value may be able to be determined which may be estimated as the original color value which would exist before the non-target image has been read from the back side of the original sheet based on information (color value such as brightness and frequency value of the color value) on the selected color value candidates.

When the estimation color is determined for a certain pixel of interest P in this way, replacing the pixel with another pixel of interest, a similar process is performed. As this occurs, the process is performed by using an inputted image for the edge region and an image that is reduced by the reduction unit 11 for the non-edge region. When estimation colors for all pixels which make up the inputted image are determined, the process on the inputted image is completed.

Note that parameters such as size and shape which are used in the respective sections of the color estimation unit 13 may be inputted from the parameter inputting section 24 by the user. Alternatively, sets of parameters and predetermined characteristics of images are stored in advance in a storage unit such as a ROM, so that a set of parameters which is most suitable for the characteristics of an inputted image may be read out from the storage unit for use. In particular, the parameters should preferably be switched based on the result of edge determination passed from the edge determination unit 12.

In addition, in the processing example shown in FIG. 4, while the block of interest W is defined for each pixel of interest and the color histograms are calculated for the pixels within the block of interest so defined, the same block (hence, the same frequency histogram) may be used for a plurality of pixels of interest. For example, assuming that the size of a block of interest is a region of 100 pixels×100 pixels, the block of interest W (and the color histograms calculated from the block of interest W) is used for all pixels of 5×5=25 which lie in the neighborhood of the region. In case this procedure is adopted, the number of times of color histogram calculation processing may be reduced, thereby making it possible to increase the overall processing speed. As this occurs, the size of the block of interest W is sufficiently large relative to the size of the group of pixels, since errors in calculated color histograms may be ignored, the capability of removing the non-target image read from the back side of the original sheet does not have to be reduced substantially.

The configuration of the color estimation unit 13 shown in FIGS. 2 and 3 and the operation of the color estimation unit 13 shown in FIG. 4 are only the examples thereof, and hence, a configuration may be adopted in which the original color which is free from the effect of the non-target image read from the back side of the original sheet is estimated by another method.

Figure 5:
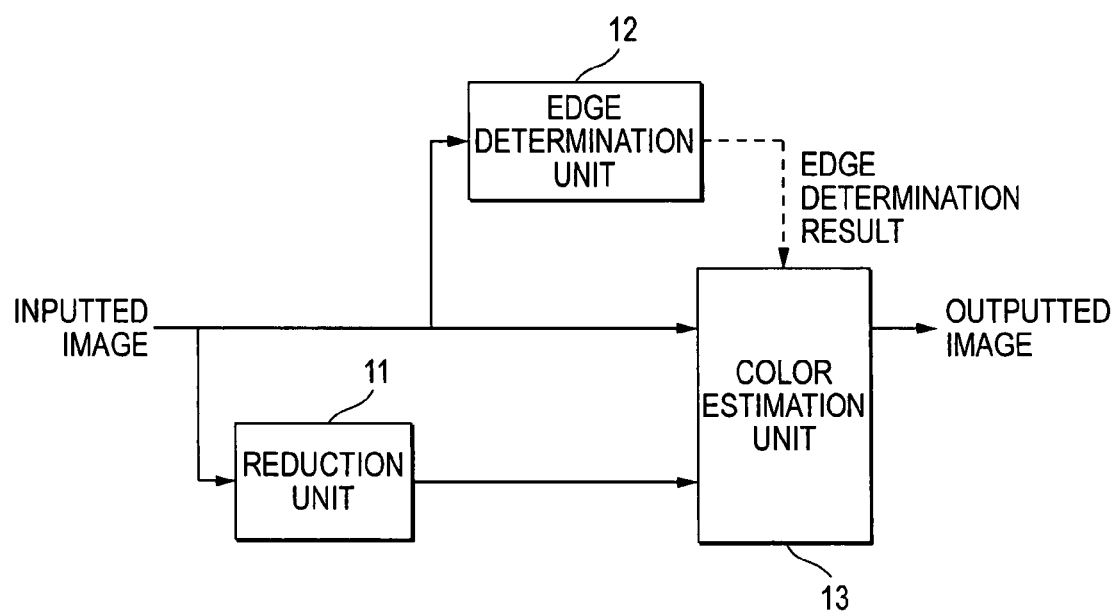
FIG. 5 illustrates a block diagram showing a first modification example to the first exemplary embodiment according to an aspect of the invention.

FIG. 5 is a block diagram showing a first modification example to the first exemplary embodiment of the invention. In the figure, reference numerals are similar to those shown in FIG. 1, and hence, descriptions which will repeat those made before will be omitted here. In the first modification example of the first exemplary embodiment, an edge detection unit 12 performs an edge determination from an inputted image. As an edge determination method adopted in the edge determination unit 12, the configuration shown in the figure is made possible by utilizing a method in which halftone dots in a halftone-dot image are not detected as edge.

Figure 6:
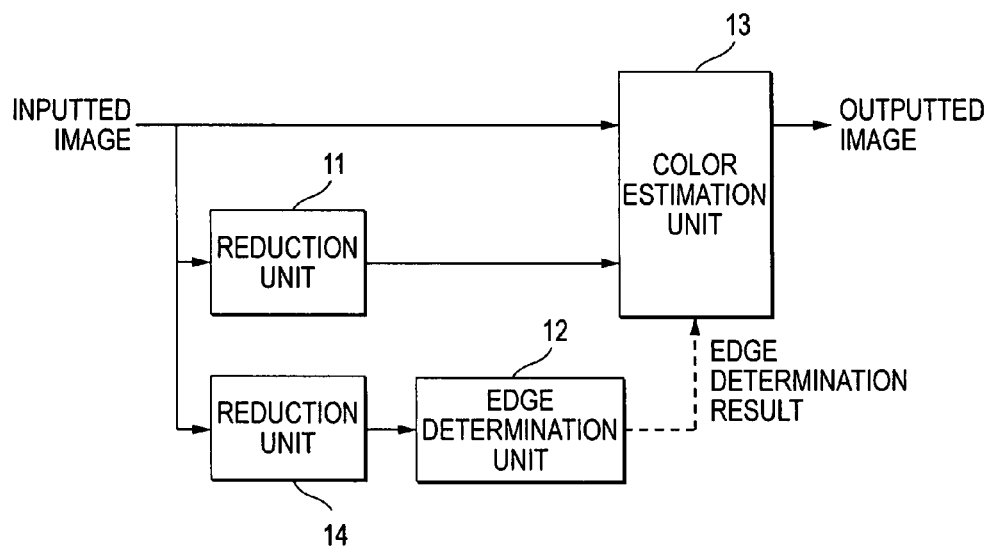
FIG. 6 illustrates a block diagram showing a second modification example to the first exemplary embodiment according to an aspect of the invention.

FIG. 6 is a block diagram showing a second modification example to the first exemplary embodiment of the invention. In the figure, like reference numerals will be imparted to like units to those shown in FIG. 1, so as to omit the repetition of a similar description. Reference numeral 14 denotes a reduction unit. In this second modification example to the first exemplary embodiment, the example is shown in which the reduction unit 14 is provided for an edge determination unit 12 separately from a reduction unit 11.

The reduction unit 14 performs a reduction process on an inputted image so that a good edge determination may be performed in the edge determination unit 12. The reduction unit 14 is allowed to adopt a reduction method and a reduction ratio which differ from those of the reduction unit 11. Note that in the reduction unit 11, a reduction process suitable for color estimation for a non-edge region may be performed in a color estimation unit 13.

The edge determination unit 12 determines an edge in the image reduced at the reduction unit 14. Since the reduced image suitable for edge determination is passed therefrom, a good edge determination may be implemented.

Figure 7:
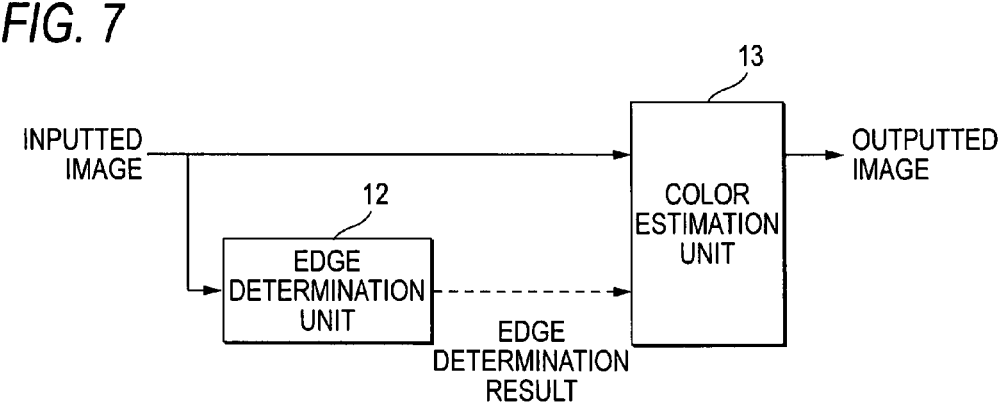
FIG. 7 illustrates a block diagram showing a third modification example to the first exemplary embodiment according to an aspect of the invention.

FIG. 7 is a block diagram showing a third modification example to the first exemplary embodiment of the invention. Reference numerals imparted therein are similar to those shown in FIG. 1, and hence, the repetition of a similar description will be omitted here. The third modification example of the first exemplary embodiment shows the example in which the reduction unit 11 is omitted. As to an inputted image which is known as containing no halftone-dot region, the inputted image may be configured so as not to be reduced at the reduction unit 11. In this case, an edge determination unit 12 performs an edge determination on the inputted image. In addition, while a color estimation unit 13 is to estimate a color from the inputted image both for an edge region and a non-edge region, settings for color estimation should be configured so as to be changed according to the result of an edge determination outputted from the edge determination unit 12. For example, where the color estimation unit 13 is configured as is shown in FIG. 2, the size of a block of interest and the size of a partial color space should be set small for the edge region, whereas, on the contrary, the size of the block or interest and the size of the partial color space should be set large for the non-edge region.

Figure 8:
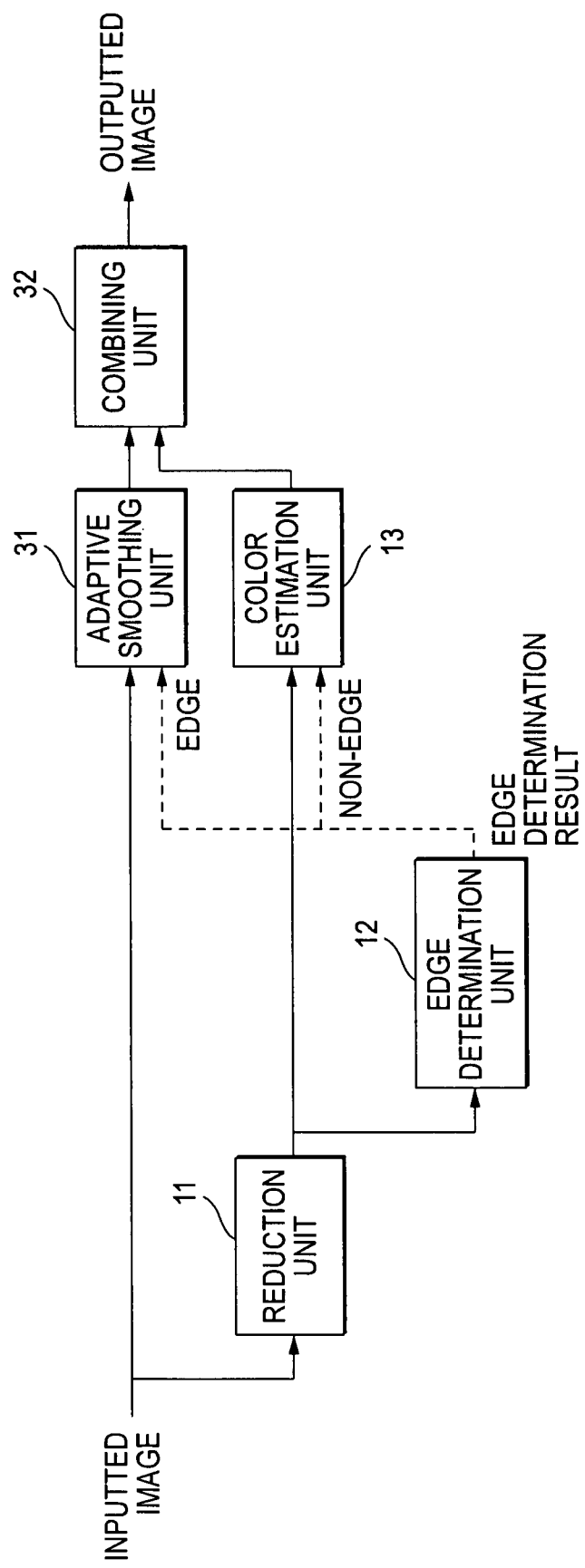
FIG. 8 illustrates a block diagram showing a second exemplary embodiment according to an aspect of the invention.

FIG. 8 is a block diagram showing a second exemplary embodiment of the invention. In the figure, like reference numerals are imparted to like units to those shown in FIG. 1, so as to omit the repetition of a similar description. Reference numeral 31 denotes an adaptive smoothing unit, and 32 a combining unit. This second exemplary embodiment shows an example in which an image which has been processed at the adaptive smoothing unit 31 is applied to an edge region.

In this embodiment, the adaptive smoothing unit 31 performs a smoothing process on an inputted image while preserving an edge for a region which is determined as edge by the edge determination unit 12. An image lying in the edge region and in which a non-target image is read from a back side of an original sheet is smoothed by the smoothing process so as to be made difficult to be visualized. A configuration example will be described later on.

In this embodiment, a color estimation unit 13 estimates a color using an image reduced by a reduction unit 11 for a region which is determined as a non-edge region by the edge determination unit 12. For the configuration of the color estimation unit 13, for example, the configuration shown in FIG. 2 may be used. When this is the case, the process is performed using a color estimation setting for the non-edge region.

The combining section 32 combines an image which is outputted from the adaptive smoothing unit 31 and hence in which the edge region has been smoothed with an image of the non-edge region in which a color has been estimated at the color estimation unit 13. Even though the color estimation unit 13 has a problem with a color estimation that is to be performed on the edge region, since the image of the edge region is combined which is smoothed by the adaptive smoothing unit 31 so that the image in which the non-target image has been read from the back side of the original sheet is made difficult to be visualized, an image may be obtained as a whole in which the non-target image read from the back side of the original sheet is duly removed.

In addition, in the event that the color estimation unit 13 outputs the results of color estimation performed on the reduced image pixel by pixel, the resolution needs to be matched when combined. In the event that the color estimation unit outputs the results of color estimation performed on the inputted image pixel by pixel, the resolution conversion is, of course, unnecessary.

While in the embodiment shown in FIG. 8, either the adaptive smoothing unit 31 or the color estimation unit 13 is configured so as to be activated according to the result of edge determination by the edge determination unit 12, for example, it may be configured such that the adaptive smoothing unit 31 and the color estimation unit 13 perform the processes over the whole area of the inputted image or the reduced image, and either of outputs from the adaptive smoothing unit 31 and the color estimation unit 13 is selected using the result of edge determination by the edge determination unit 12 at the combining unit 32.

Figure 9:
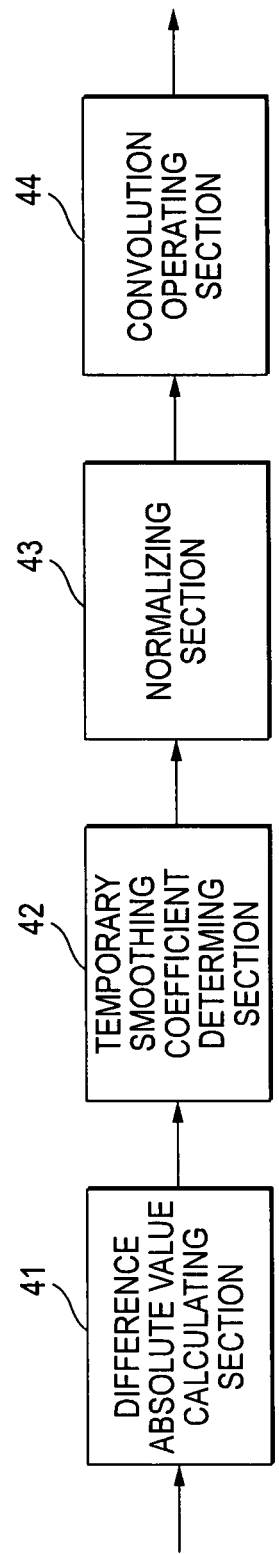
FIG. 9 illustrates a block diagram showing an exemplary example of an adaptive smoothing unit.

FIG. 9 is a block diagram showing an exemplary example of the configuration of the adaptive smoothing unit. In the figure, reference numeral 41 denotes a difference absolute value calculating section, 42 a temporary smoothing coefficient determining section, 43 a normalizing section and 44 a convolution operating section. As an exemplary example of the adaptive smoothing unit 31 shown in FIG. 8, the adaptive smoothing unit may be realized by the configuration shown in FIG. 9.

The difference absolute value calculating section 41 sets a window region of a predetermined size which is centered at a pixel of interest which constitutes an object of smoothing process and calculates an absolute value of a difference between the value of the pixel of interest (letting this be Vi) and the value (letting this be Vj) of a pixel within the window region ($Aj=|Vi-Vj|$), respectively.

The temporary smoothing coefficient determining section 42 temporarily determines a smoothing coefficient (Cj) which corresponds to each pixel within the window region. As a method for temporarily determining the smoothing coefficient (Cj), a method is used here in which a certain monotone decreasing function f () is set, and a smoothing coefficient Cj may temporarily be determined by Cj=f (Aj). Since f () is the monotone decreasing function, the smoothing coefficient Cj takes a small value for a pixel in which the difference absolute value is large as seen in the edge, whereby the effect of the smoothing on the pixel of interest may be reduced. On the contrary, the smoothing coefficient Cj takes a large value for a pixel in which the difference absolute value is small as seen the non-edge region, whereby the effect of the smoothing on the pixel of interest may be increased. Although the monotone decreasing function f () is arbitrary, various functions are applicable which include a linear function like Cj=1−(1/max (Aj))·Aj, second-order or higher monotone decreasing function and exponential monotone decreasing function. Note that max (Aj) in the equation denotes a maximum value of Aj.

The normalizing section 43 normalizes the smoothing coefficient Cj which has been temporarily determined at the temporary smoothing coefficient determining section 42. Namely, the normalizing section 43 performs an operation such that a sum of smoothing coefficients Cj within the window region becomes 1. Specifically, assuming that a smoothing coefficient after normalization is Cj', it may be obtained by Cj'=Cj/ΣCj. This normalization is carried out due to smoothing process being generally a filter process with a sum of smoothing coefficients being 1.

The convolution operating section 44 performs a so-called convolution operation using pixel values within the window region and the normalized smoothing coefficient normalized at the normalizing section 43. The convolution operation is performed such that the pixel values within the window region are multiplied by the smoothing coefficient normalized at the normalizing section 43 and thereafter a total sum is operated. Namely, letting the value of a pixel of interest after the operation be Vi', it may be operated by Vi'=ΣCj'·Vj.

In this way, in the adaptive smoothing process, the smoothing coefficient is determined according to the image, and as this occurs, since the larger the magnitude of absolute value of the difference between the pixel values becomes, the smoothing coefficient is set smaller, edge is preserved in the edge region, while in the non-edge region, the flatter the region becomes, the more severely the smoothing process is applied. For example, when a portion where the pixel value is changed due to reading the non-target image from the back side of the original sheet lies in the neighborhood of the edge, the edge itself is preserved, while the change in pixel value due to reading the non-target image from the back side of the original sheet is smoothed so that the change may be made difficult to be visualized.

Figure 10:
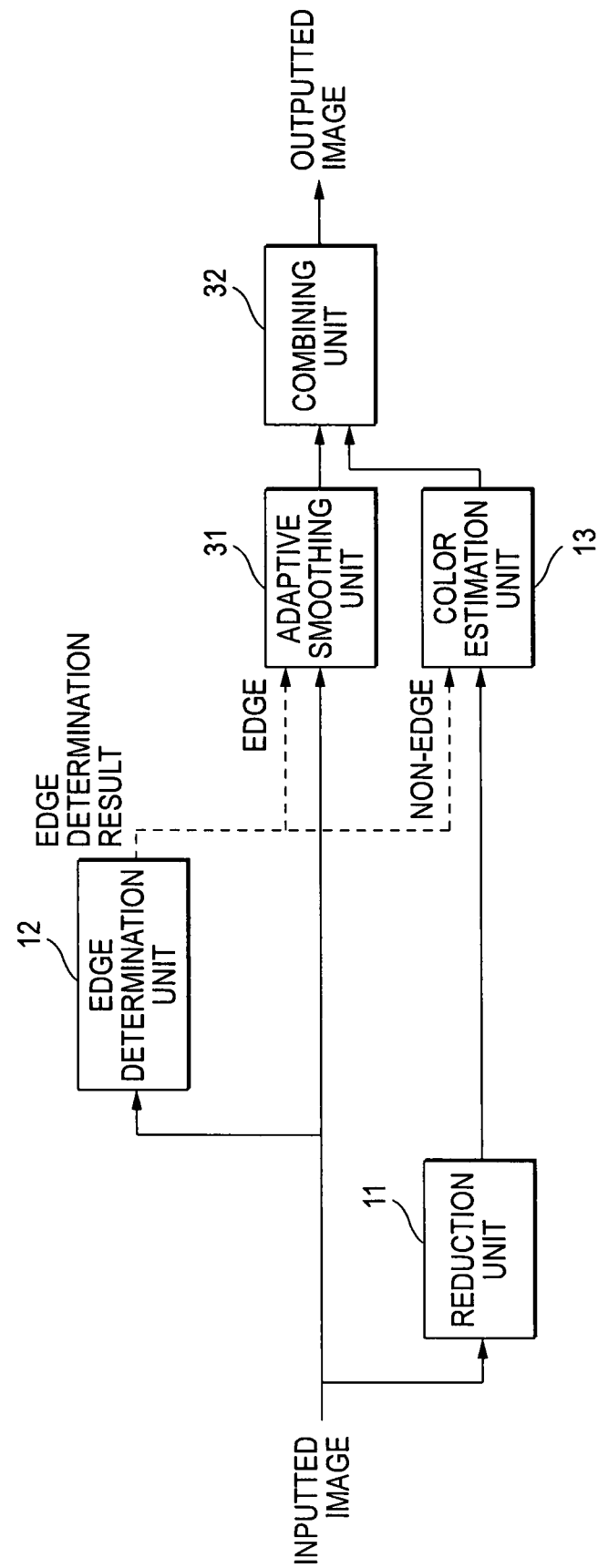
FIG. 10 illustrates a block diagram showing a first modification example to the second exemplary embodiment according to an aspect of the invention.

FIG. 10 is a block diagram showing a first modification example to the second exemplary embodiment of the invention. In the figure, reference numerals imparted therein are similar to those in FIG. 8, and the repetition of a similar description will be omitted here. In the first modification example to the second exemplary embodiment, an edge determination unit 12 performs an edge determination from an inputted image. As an edge determination method adopted in the edge determination unit 12, a method is adopted in which halftone dots in a halftone-dot image are not detected as edge, whereby the configuration shown in the figure may be realized.

Figure 11:
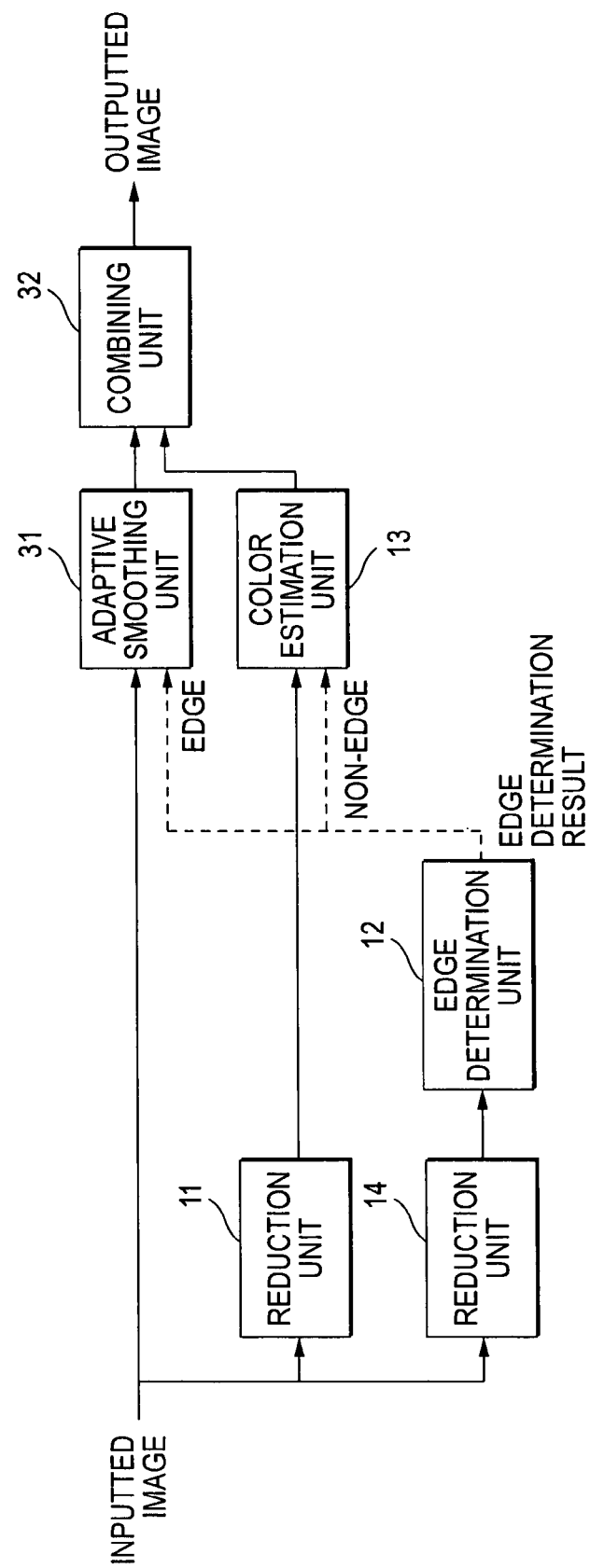
FIG. 11 illustrates a block diagram showing a second modification example to the second exemplary embodiment according to an aspect of the invention.

FIG. 11 is a block diagram showing a second modification example to the second exemplary embodiment of the invention. In the figure, like reference numerals are imparted to like units to those shown in FIGS. 8 and 6, so as to omit there petition of a similar description. Similar to the second modification example to the first exemplary embodiment, the second modification example to the second exemplary embodiment shows the example in which a reduction unit 14 for an edge determination unit 12 is provided separately from a reduction unit 11. According to this configuration, the reduction unit 11 performs an optimum reduction process for color estimation at a color estimation unit 13, while the reduction unit 14 may perform an optimum reduction process for edge determination at the edge determination unit 12.

In addition, as with the third modification example to the first exemplary embodiment shown in FIG. 7, also in this second modification example to the second exemplary embodiment, a configuration may be adopted in which the reduction unit 11 is not provided.

FIG. 12 is a block diagram showing a third embodiment of the invention. In the figure, like reference numerals are imparted to like units to those shown in FIG. 1, so as to omit the repetition of a similar description. Reference numeral 51 denotes an edge intensity detection unit, and 52 a correcting and combining unit. In the first and second exemplary embodiments, the example is shown in which the processes are switched depending on whether the region is determined as the edge region or the non-edge region. The third embodiment shows an exemplary example in which the degree at which the application of color estimation value is changed according the intensity of edge.

In this embodiment, the edge intensity detection unit 51 detects the intensity of edge in an image reduced by a reduction unit 11 from the image. For example, a differential or quadratic differential of image or other methods may be used.

The correcting and combining unit 52 combines an inputted image with an image in which color is estimated by a color estimation unit 13 according to edge intensity detected at the edge intensity detecting unit 51. As an example of the combining process, a combining process by a function which uses edge intensity as a parameter may be raised in which the images are combined between the color of an inputted image and a color estimated by the color estimation unit 13 in such a manner that in the event that the edge intensity is strong, the color of the combined image becomes the color of the inputted image or a color similar thereto, while in the event that the edge intensity is weak, the color of the combined image becomes the color estimated by the color estimation unit 13 or a color similar thereto.

Figure 13A:
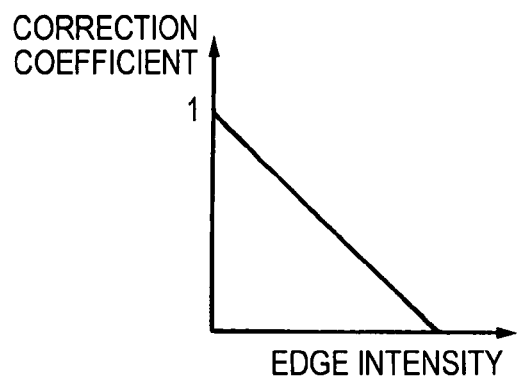
FIGS. 13A and 13B illustrate explanatory diagrams illustrating exemplary examples of functions for calculating correction coefficients.
Figure 13B:
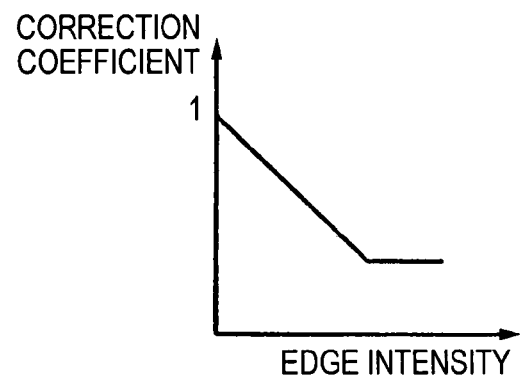

Alternatively, a configuration may be adopted in which a difference between the estimated color and the color of the reduced image is made to be outputted from the color estimation unit 13, a correction amount is calculated from the difference outputted from the color estimation unit 13 and the edge intensity at the correcting and combining unit 52, and a value resulting after the combination of the images is calculated by applying the correction value so calculated to the value of the inputted image. FIG. 13 is an explanatory drawing of an exemplary example of a function for calculating a correction coefficient. A correction coefficient is obtained by a function as is shown in FIG. 13 using an edge intensity obtained from the edge intensity detection unit 51, the difference in color between the color estimated and outputted from the color estimation unit 13 and the color of the reduced image is multiplied by the correction coefficient so as to obtain a correction amount, so that the inputted image may be corrected by the correction amount so obtained. FIG. 13A shows a linear function, and FIG. 13B shows an exemplary example in which the correction value is fixed to a predetermined value with a certain edge intensity or higher. Any function may be used arbitrarily to obtain a correction function, and the invention is, of course, not limited to the illustrated example. In addition, an operation may be set arbitrarily for obtaining a correction amount from the correction coefficient and the difference.

In this way, the inputted image is corrected at the correcting and combining unit 52 using the estimation color by the color estimation unit 13 according to the intensity of edge, whereby by combining the inputted image with the image resulting after the color has been estimated, the processes do not have to be different between the edge region and the non-edge region, and an image may be obtained from which the non-target image read from the back side of the original sheet and having the weak edge intensity is removed.

Figure 14:
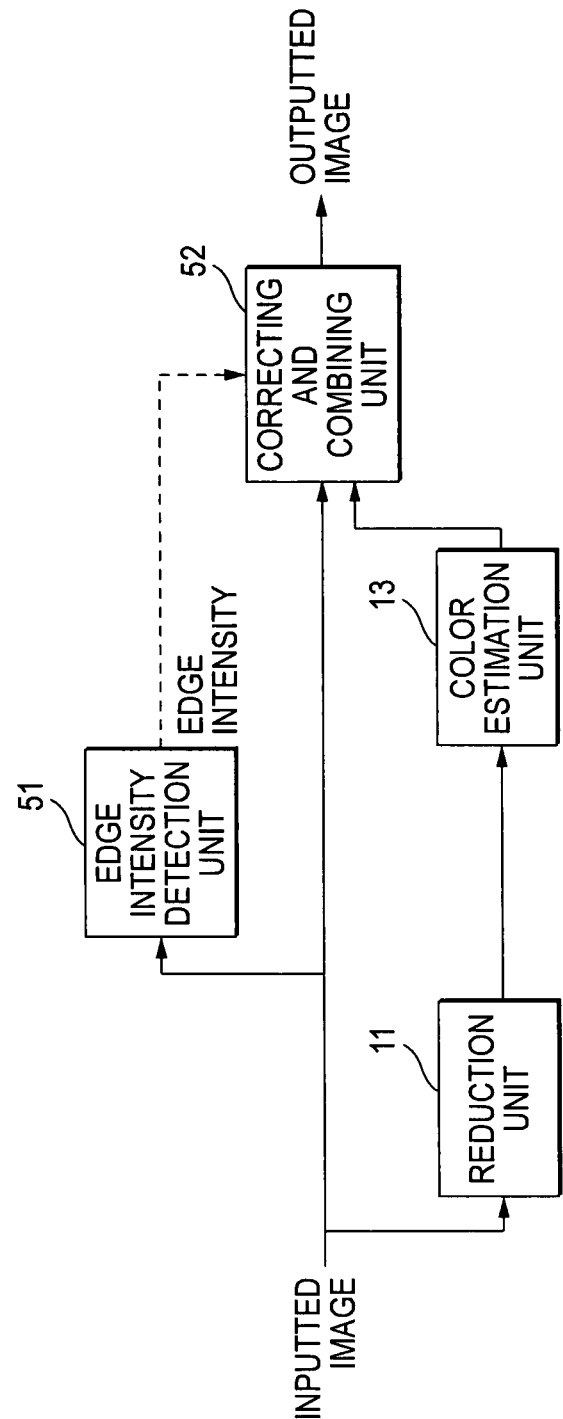
FIG. 14 illustrates a block diagram showing a first modification example to the third exemplary embodiment according to an aspect of the invention.
Figure 15:
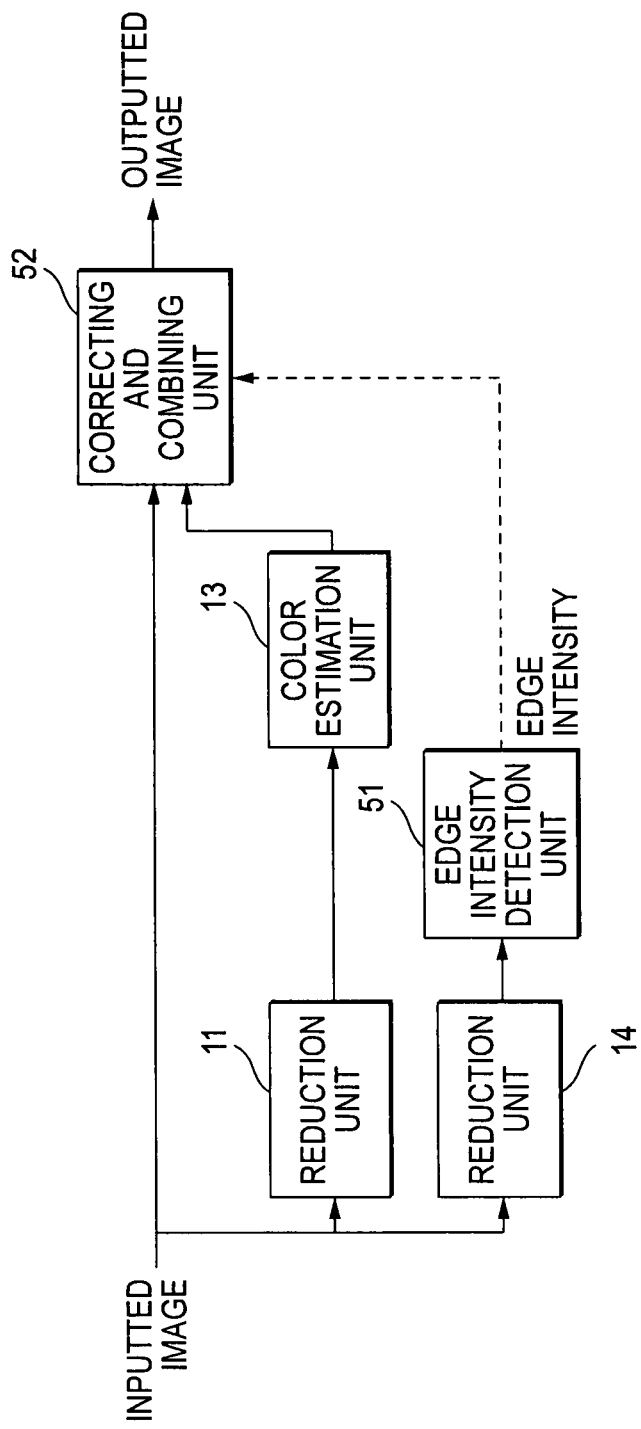
FIG. 15 illustrates a block diagram showing a second modification example to the third exemplary embodiment according to an aspect of the invention.

FIG. 14 is a block diagram showing a first modification example to the third embodiment of the invention, and FIG. 15 is a block diagram showing a second modification example to third embodiment of the invention. In the figures, like reference numerals are imparted to like units to those shown in FIGS. 12 and 6, so as to omit the repetition of similar descriptions. Also, in this third embodiment, modifications similar to those in the first and second exemplary embodiments are possible. In the first modification example to the third embodiment shown in FIG. 14, an edge detection unit 51 detects the intensity of edge from an inputted image. When detecting edge intensity, in case edge intensity may be detected in such a manner as to be affected by halftone dots in a halftone-dot image and the like, the configuration may be realized.

In addition, in the second modification example to the third embodiment shown in FIG. 15, similar to the second modification example to the first exemplary embodiment, the second modification example to the third embodiment shows the example in which a reduction unit 14 for the edge determination unit 51 is provided separately from a reduction unit 11. According to this configuration, the reduction unit 11 performs an optimum reduction process for color estimation at a color estimation unit 13, while the reduction unit 14 may perform an optimum reduction process for edge determination at an edge determination unit 12.

Furthermore, as with the third modification example to the first exemplary embodiment shown in FIG. 7, also in this second modification example to the third embodiment, a configuration may be adopted in which the reduction unit 11 is not provided.

FIG. 16 is an explanatory diagram showing an exemplary example of a computer program which results when realizing the function of the image processor of the invention by a computer program, a storage medium which stores the computer program and a computer installing therein the storage medium. In the figure, reference numeral 61 denotes a program, 62 a computer, 71 a magneto-optic disk, 72 an optical disk, 73 a magnetic disk, 74 a memory, 81 a CPU, 82 an internal memory, 83 a reading unit, 84 a hard disk, 85, 86 interfaces, and 87 a communication unit.

Part or the whole of the functions of the units and sections of the image processor of the invention which have been described by reference to the embodiments thereof may be realized by a program 61 may be executed on a computer. In this case, the program 61 and data that is used by the program 61 may be stored in a storage medium which the computer may read. The storage medium is such as to induce a change in energy in the form of magnetism, light, electricity and the like relative to a reading unit 83 provided in a hardware resource of the computer according to the description contents of the program so as to transmit the description contents of the program in a signal format corresponding to the change so induced. For example, the storage medium includes, for example, a magneto-optic disk 71, an optical disk 72 (including a CD, a DVD and the like), a magnetic disk 73, a memory 4 (including an IC card, a memory card and the like) and the like. These storage media are not limited to a portable type.

The program 61 is stored in these storage media, the program 61 is read out from the computer by connecting these storage media to the reading unit 83 or the interface 85 of the computer 62 so as to be stored on the internal memory 82 or the hard disk 84, and the program 61 is then executed by the CPU 81, whereby the functions of the image processor of the invention may be realized. Alternatively, a configuration may be adopted in which the program 61 is transmitted to the computer 62 via a network or the like, and at the computer 62, the program 61 is received at the communication unit 87 so as to be stored on the internal memory 82 or the hard disk 84, so that the program 61 so stored is then executed by the CPU 81, whereby the functions of an image tilt detector or the image processor of the invention may be realized. In addition, various other devices may be connected to the computer 62 via the interface 86, and for example, a display unit for displaying information, an input unit on which the user inputs information and the like are also connected to the computer 62.

Of course, part of the functions may be configured by hardware, or all of the functions may be configured by the hardware. Alternatively, the invention may be incorporated into a program which contains not only the invention but also other configurations. For example, the image processor of the invention may be configured as one program together with a control program in an apparatus which incorporates, for example, an image reading apparatus and an image forming apparatus such as a photocopier so as to remove from an image read by the image reading apparatus in such a manner as to contain a non-target image which is read from a back side of an original sheet together with a target image the non-target image so read from the back side of the original sheet. Of course, when applied to other applications, the image processor of the invention may be incorporated into a program for the application.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing device, comprising:
    an edge determination unit that determines an edge in an image;
    a color estimation unit that identifies a non-target image to remove the non-target image from the image by selecting a block of interest region in the image based on a neighborhood of a target pixel on which a non-target image removing process is to be performed and estimates an original color of the image which is not affected by another image read together as a non-target image, according to a result of the edge determination performed by the edge determination unit; and
    a color value candidate selecting unit that substitutes a color of a target pixel on which a non-target image removing process is to be performed and performs a quadratic differential on a histogram within a partial color space from a position within a color space which corresponds to the color of the target pixel; wherein a length of the partial color space is determined by the following relationships:

$L = f[B(P)]$: $f[x]$ is a monotone increasing function of x
$L = g[E(P)]$: $g[x]$ is a monotone decreasing function of x; where
$f(x) = a \times x^{(n)}$,
$g(x) = -a \times x^{(n)}$,
B(P) is a brightness of a pixel of interest,
E(P) is a degree of edge of the pixel of interest, and
a is a positive constant and n is a real value which is equal to or larger than 1.

2. The image processing device according to claim 1, further comprising:
a reduction unit that reduces an inputted image,
wherein the edge determination unit determines an edge using an image reduced by the reduction unit.

3. The image processing device according to claim 2,
wherein the color estimation unit utilizes for estimation an inputted image for a region which is determined as an edge by the edge determination unit, while the color estimation unit utilizes for estimation the image that is reduced by the reduction unit for a region which is determined as a non-edge.

4. The image processing device according to claim 1, further comprising:
a reduction unit that reduces an inputted image,
wherein the color estimation unit utilizes for estimation an inputted image for a region which is determined as an edge by the edge determination unit, while the color estimation unit utilizes for estimation an image that is reduced by the reduction unit for a region which is determined as a non-edge.

5. The image processing device according to claim 1, further comprising:
a first reduction unit and a second reduction unit, which reduce an inputted image,
wherein the edge determination unit determines an edge by utilizing an image that is reduced by the second reduction unit, and
wherein the color estimation unit utilizes for estimation an inputted image for a region which is determined as an edge by the edge determination unit, while the color estimation unit utilizes for estimation an image that is reduced by the first reduction unit for a region which is determined as a non-edge.

6. The image processing device according to claim 1,
wherein the color estimation unit changes settings for color estimation based on a result of a determination by the edge determination unit.

7. The image processing device according to claim 1, further comprising:
an adaptive smoothing unit that performs a smoothing process while preserving an edge; and
a combining unit that combines an output from the adaptive smoothing unit and an output from the color estimation unit,
wherein the adaptive smoothing unit performs a smoothing process on a region which is determined as an edge by the edge determination unit, while the color estimation unit performs an estimation of a color on a region which is determined as a non-edge by the edge determination unit.

8. The image processing device according to claim 7, further comprising:
a reduction unit that reduces an inputted image,
wherein the edge determination unit determines an edge by utilizing an image reduced by the reduction unit, while the color estimation unit estimates a color by utilizing the image reduced by the reduction unit.

9. The image processing device according to claim 7, further comprising:
a reduction unit that reduces an inputted image,
wherein the color estimation unit estimates a color by utilizing an image reduced by the reduction unit.

10. The image processing device according to claim 7, further comprising:
a first reduction unit and a second reduction unit, which reduce an inputted image,
wherein the edge determination unit determines an edge by utilizing an image that is reduced by the second reduction unit, and
wherein the color estimation unit estimates a color by utilizing an image that is reduced by the first reduction unit.

11. The image processing device according to claim 1,
wherein the another image is read from a back side of a sheet that has the image formed on a front side.

12. The image processing device according to claim 1,
wherein said another image is read from another sheet on which a sheet having the image is stacked.

13. An image processing device, comprising:
an edge intensity detection unit that detects an intensity of an edge in an image;
a color estimation unit that identifies a non-target image to remove the non-target image from the image by selecting a block of interest region in the image based on a neighborhood of a target pixel on which a non-target image removing process is to be performed and estimates an original color of the image which is not affected by another image read together as a non-target image; and
a combining unit that combines an inputted image and an image whose original color is estimated by the color estimation unit according to the intensity of an edge in the inputted image which is detected by the edge intensity detection unit; and
a color value candidate selecting unit that substitutes a color of a target pixel on which a non-target image removing process is to be performed and performs a quadratic differential on a histogram within a partial color space from a position within a color space which corresponds to the color of the target pixel; wherein
a length of the partial color space is determined by the following relationships:

$L = f[B(P)]$: $f[x]$ is a monotone increasing function of x
$L = g[E(P)]$: $g[x]$ is a monotone decreasing function of x; where
$f(x) = a \times x^{(n)}$,
$g(x) = -a \times x^{(n)}$,
B(P) is a brightness of a pixel of interest,
E(P) is a degree of edge of the pixel of interest, and
a is a positive constant and n is a real value which is equal to or larger than.

14. The image processing device according to claim 13, further comprising:
a reduction unit that reduces an inputted image,
wherein the edge intensity detection unit detects the edge intensity by utilizing an image reduced by the reduction unit, while the color estimation unit estimates a color by utilizing the image which is reduced by the reduction unit.

15. The image processing device according to claim 13, further comprising:
a reduction unit that reduces an inputted image,
wherein the color estimation unit estimates a color by utilizing an image which is reduced by the reduction unit.

16. The image processing device according to claim 13, further comprising:
a first reduction unit and a second reduction unit, which reduce an inputted image,
wherein the edge intensity detection unit determines an edge by utilizing an image that is reduced by the second reduction unit, and
wherein the color estimation unit estimates a color by utilizing an image that is reduced by the first reduction unit.

17. The image processing device according to claim 13, wherein said another image is read from a back side of a sheet that has the image formed on a front side.

18. The image processing device according to claim 13, wherein said another image is read from another sheet on which a sheet having the image is stacked.

19. A non-transitory computer readable medium storing a program causing a computer to execute a process for processing an image, the process comprising:
determining an edge in an image;
identifying a non-target image to remove the non-target image from the image by selecting a block of interest region in the image based on a neighborhood of a target pixel on which a non-target image removing process is to be performed;
estimating an original color of the image which is not affected by another image read together as a non-target image, according to a result of the edge determination; and
substituting a color of a target pixel on which a non-target image removing process is to be performed and performing a quadratic differential on a histogram within a partial color space from a position within a color space which corresponds to the color of the target pixel; wherein
a length of the partial color space is determined by the following relationships:
$L=f[B(P)]$:$f[x]$ is a monotone increasing function of x
$L=g[E(P)]$:$g[x]$ is a monotone decreasing function of x;
where
$f(x)=a \times x^{(n)}$,
$g(x)=-a \times x^{(n)}$,
B(P) is a brightness of a pixel of interest,
E(P) is a degree of edge of the pixel of interest, and
a is a positive constant and n is a real value which is equal to or larger than.

20. An image processing device comprising:
an edge determination unit that determines whether a pixel of an imputed image is in an edge region or in a non-edge region;
a reduction unit that reduces the inputted image;
a color estimation unit that estimates original colors both of the edge region and the non-edge region so as not to be affected by a back image shown in a back side of a sheet of the inputted image, wherein
the color estimation unit uses the inputted image for color estimation of the edge region determined by the edge determination unit,
the color estimation unit uses the reduced image reduced by the reduction unit for color estimation of the non-edge region determined by the edge determination unit, and
the color estimation unit (i) sets a block of interest region including a target pixel in the inputted image, (ii) calculates a frequency value in a color space of the block of interest region and (iii) selects a color value candidate based on the frequency value as an estimated color of the edge region or the non-edge region;
a color substitution unit that substitutes a color of the target pixel on which a non-target image removing process is to be performed and performs a quadratic differential on a histogram within a partial color space from a position within the color space which corresponds to the color of the target pixel; wherein
a length of the partial color space is determined by the following relationships:
$L=f[B(P)]$:$f[x]$ is a monotone increasing function of x
$L=g[E(P)]$:$g[x]$ is a monotone decreasing function of x;
where
$f(x)=a \times x^{(n)}$,
$g(x)=-a \times x^{(n)}$,
B(P) is a brightness of a pixel of interest,
E(P) is a degree of edge of the pixel of interest, and
a is a positive constant a is a positive constant and n is a real value which is equal to or larger than 1;
an adaptive smoothing unit that performs a smoothing process while preserving an edge in the edge region determined by the edge determination unit, and
a combining unit that combines the smoothed edge region performed by the adaptive smoothing unit and the color in the non-edge region estimated by the color estimation unit.

21. The image processing device according to claim 20, wherein
a size of the block of interest region includes a first size for color estimation of the edge region and a second size for color estimation of the non-edge region, and
the second size is equal to or larger than the first size.

* * * * *